United States Patent
Seegan et al.

(10) Patent No.: US 11,636,272 B2
(45) Date of Patent: *Apr. 25, 2023

(54) HYBRID NATURAL LANGUAGE UNDERSTANDING

(71) Applicant: Verint Americas Inc., Alpharetta, GA (US)

(72) Inventors: Timothy Seegan, Spokane, WA (US); Ian Roy Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,873

(22) Filed: Jan. 28, 2022

(65) Prior Publication Data

US 2022/0156467 A1 May 19, 2022

Related U.S. Application Data

(63) Continuation of application No. 16/528,861, filed on Aug. 1, 2019, now Pat. No. 11,270,082.

(Continued)

(51) Int. Cl.
*G06F 40/40* (2020.01)
*G06F 40/253* (2020.01)
*G06F 40/30* (2020.01)
*G06N 3/08* (2023.01)
*H04L 51/02* (2022.01)

(52) U.S. Cl.
CPC ............ *G06F 40/40* (2020.01); *G06F 40/253* (2020.01); *G06F 40/30* (2020.01); *G06N 3/08* (2013.01); *H04L 51/02* (2013.01)

(58) Field of Classification Search
CPC ........ G06F 40/40; G06F 40/253; G06F 40/30; H04L 51/02
See application file for complete search history.

(56) References Cited

U.S. PATENT DOCUMENTS 9,460,713 B1 10/2016 Moreno Mengibar et al.
9,563,622 B1 2/2017 Anderson
(Continued)

OTHER PUBLICATIONS

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

(Continued)

*Primary Examiner* — Kevin Ky
(74) *Attorney, Agent, or Firm* — Meunier Carlin & Curfman LLC

(57) ABSTRACT

Hybrid natural language understanding (NLU) systems and methods are provided that capitalize on the strengths of the rule-based models and the statistical models, lowering the cost of development and increasing the speed of construction, without sacrificing control and accuracy. Two models are used for intent recognition, one statistical and one rule-based. Both models define the same set of intents, but the rule-based model is devoid of any grammars or patterns initially. Each model may or may not be hierarchical in that it may be composed of a set of specialized models that are in a tree form or it may be just a singular model.

20 Claims, 6 Drawing Sheets

Related U.S. Application Data

(60) Provisional application No. 62/719,747, filed on Aug. 20, 2018.

(56) References Cited

U.S. PATENT DOCUMENTS

| | | | |
|---|---|---|---|
| 10,163,436 B1* | 12/2018 | Slifka | G10L 13/00 |
| 10,515,153 B2 | 12/2019 | Heilman et al. | |
| 10,635,987 B1 | 4/2020 | Chen et al. | |
| 2004/0148154 A1 | 7/2004 | Acero et al. | |
| 2007/0143485 A1 | 6/2007 | Da Palma et al. | |
| 2008/0152121 A1 | 6/2008 | Mandalia et al. | |
| 2008/0270116 A1 | 10/2008 | Godbole et al. | |
| 2009/0119157 A1 | 5/2009 | Dulepet | |
| 2009/0281870 A1 | 11/2009 | Sun et al. | |
| 2011/0029303 A1 | 2/2011 | Mizuguchi et al. | |
| 2013/0110928 A1 | 5/2013 | Ghosh et al. | |
| 2014/0052684 A1 | 2/2014 | Liao et al. | |
| 2014/0095147 A1 | 4/2014 | Hebert et al. | |
| 2014/0095426 A1 | 4/2014 | Nicholson et al. | |
| 2014/0163959 A1* | 6/2014 | Hebert | G06F 16/3344 704/9 |
| 2014/0249830 A1* | 9/2014 | Gallopyn | G16Z 99/00 705/2 |
| 2014/0372226 A1 | 12/2014 | Pavley et al. | |
| 2016/0098480 A1 | 4/2016 | Nowson | |
| 2016/0148612 A1* | 5/2016 | Guo | G06F 40/237 704/257 |
| 2016/0162779 A1 | 6/2016 | Marcus et al. | |
| 2017/0235830 A1 | 8/2017 | Smith et al. | |
| 2017/0249389 A1 | 8/2017 | Brovinsky et al. | |
| 2017/0249934 A1* | 8/2017 | Kang | G06F 40/279 |
| 2018/0052910 A1 | 2/2018 | Allen et al. | |
| 2018/0089572 A1* | 3/2018 | Aili | G06F 9/453 |
| 2018/0329878 A1* | 11/2018 | Hirzel | G06F 40/35 |
| 2018/0374482 A1* | 12/2018 | Woo | G10L 15/22 |
| 2019/0087728 A1 | 3/2019 | Agarwal et al. | |
| 2019/0147371 A1 | 5/2019 | Deo et al. | |
| 2019/0236617 A1 | 8/2019 | Gholston et al. | |
| 2020/0081865 A1 | 3/2020 | Farrar et al. | |
| 2021/0192552 A1 | 6/2021 | Gugnani et al. | |

OTHER PUBLICATIONS

Bolukbasi, T., et al., "Man is to Computer Programmer as Woman is to Homemaker? Debiasing Word Embeddings," arXiv: 1607.06520v1, 2016, 25 pages.

Brill, E., "Transformation-Based Error-Driven Learning and Natural Language Processing: A Case Study in Part-of-Speech Tagging," Association for Computational Linguistics, 1995, 24 pages.

Buda, M., et al., "A systematic study of the class imbalance problem in convolutional neural networks," Neural Networks, vol. 106, 2018, pp. 249-259.

Correa, T., et al., "Who interacts on the Web?: The intersection of users' personality and social media use," Computers in Human Behavior, vol. 26, No. 2, 2010, pp. 247-253.

Dumoulin, J., "Using Multiple Classifiers to Improve Intent Recognition in Human Chats," MAICS, 2014, 6 pages.

Kim, Y-B., et al., "Onenet. Joint Domain, Intent, Slot Prediction for Spoken Language Understanding," IEEE Automatic Speech Recognition and Understanding Workshop (ASRU), 2017, 7 pages.

Kim, B., et al., "Two-stage multi-intent detection for spoken language understanding," Multimedia Tools and Applications, 2016, 14 pages.

Kuhn, R., et al., "The Application of Semantic Classification Trees to Natural Language Understanding," IEEE Transactions on Pattern Analysis and Machine Intelligence, vol. 17, No. 5, 1995, 12 pages.

Lison, P., "Structured Probabilistic Modelling for Dialogue Management," Dissertation, University of Oslo, 2014, 30 pages.

Ratnaparkhi, A., "A Maximum Entropy Model for Part-of-Speech Tagging," Conference on Empirical Methods in Natural Language Processing (EMNLP), 1996, 10 pages.

Xu, H., et al., "LLT-PolyU: Identifying Sentiment Intensity in Ironic Tweets," Proceedings of the 9$^{th}$ International Workshop on Semantic Evaluation (SemEval 2015) Jun. 4-5, 2015, Denver, CO, pp. 673-678.

European Search Report, dated Jan. 15, 2020, received in connection with corresponding EP Patent Application No. 19189902.0.

\* cited by examiner

HYBRID NATURAL LANGUAGE UNDERSTANDING

CROSS-REFERENCE TO RELATED APPLICATIONS

This application is a continuation of U.S. patent application Ser. No. 16/528,861, filed on Aug. 1, 2019, entitled "HYBRID NATURAL LANGUAGE UNDERSTANDING," which claims the benefit of priority to U.S. Provisional Patent Application No. 62/719,747, filed on Aug. 20, 2018, entitled "HYBRID NATURAL LANGUAGE UNDERSTANDING," the contents of which are hereby incorporated by reference in their entireties.

BACKGROUND

Intelligent virtual assistants (IVAs) and chatterbots (also referred to as chatbots) can be implemented in a multitude of ways, but common to all is a component for natural language understanding (NLU), which is used for the translation of user inputs into a semantic representation. Regardless of the means in which the user is interacting with the IVA (keyboard, speech, gestures, etc.), the user input is first converted into text or a numerical feature representation and fed into the NLU component for analysis. The NLU component maps user inputs, or conversational turns, to a derived semantic representation commonly known as the user intention or simply intent. In the context of natural language processing, intent is defined as an interpretation of a statement or question that allows one to formulate the 'best' response to the statement.

The collection of syntax, semantics, and grammar rules that defines how input language maps to an intent within the NLU component is referred to as a language model. The NLU component may perform pre-processing steps such as part-of-speech tagging, stemming, and entity identification (such as proper names or dates) before feeding the text into the language model. Each of these parsers may be trained through machine learning methods or manually constructed by human experts.

There are two primary techniques to construct the language model. The first technique uses rules-based (e.g., human-curated) methods such as regular expressions or grammars to define the structure and content of language associated to a particular intent. By applying these patterns or grammars to the input text, the correct intent can be determined. The intent associated with the matching grammar or pattern is selected in cases where there is no ambiguity. If multiple patterns match, the correct intent may be selected by a scoring mechanism applied to all patterns that match or other means such as ontological methods.

The second technique to construct a language model is through statistical means. Text that is similar to the expected input text is labeled (e.g., by humans) to be associated with particular intentions. This labeled data is then used to train a model of the distribution of input text over the known intentions using various machine learning approaches. Common approaches include support vector machines, neural networks, and decision trees.

For either language model construction technique, the language model can be constructed as a tree, where general knowledge is understood at the root and specific intents at the leaves. For example, statistical models can be trained on language related to particular domains or tasks such as looking up the weather or ordering food. These specialized models can then be leaves under a higher-level model that chooses the domain or task or learned jointly into a single hierarchical model. These trees can be multiple levels deep depending on how many sub-domain layers are modeled.

There are strengths and weaknesses for the two common language model construction techniques. A strength of rule-based (human-curated) methods is the control by the human over language that will match for a given intent. They can guarantee that a particular intention will always be returned in circumstances defined by business rules. With statistical approaches, this is more difficult as the distribution of the training data will affect which intention returned, and it is difficult to determine how to retrain a model in a way that will guarantee a change required by business rules. In addition, rule-based models can much more easily take into account context and control the flow of a conversation. For example, rule-based language models can be dynamically changed as a conversation processes to prevent or enable intentions based on the current context of the conversation. With statistical approaches, it is much harder to explicitly prevent or enable a particular intent during run time.

Statistical models, on the other hand, have some benefits over rule-based models. One such advantage is the cost of construction and maintenance. Human time is very expensive, to which computation time is cheap in comparison. Given the existence of labeled training data, it is much cheaper to construct a statistical model from it than a rule-based model built by humans. Another advantage is the speed of construction. Training a statistical model is much faster than humans defining rules manually.

Thus, rule-based models and statistical models each have some deficiencies.

SUMMARY

Hybrid NLU systems and methods are provided that capitalize on the strengths of the rule-based models and the statistical models, lowering the cost of development and increasing the speed of construction, without sacrificing control and accuracy. Two models are used for intent recognition, one statistical and one rule-based. Both models define the same set of intents, but the rule-based model is devoid of any grammars or patterns initially. Each model may or may not be hierarchical in that it may be composed of a set of specialized models that are in a tree form or it may be just a singular model.

In an implementation, a system for hybrid natural language understanding (NLU) is provided. The system includes a rule-based NLU module configured to determine a first intent based on a user input; a statistical NLU module configured to determine a second intent based on the user input; and a decider configured to determine and output a third intent based on the first intent and the second intent.

Implementations may include some or all of the following features. The rule-based NLU module, the statistical NLU module, and the decider are comprised within a computing device. The rule-based NLU module, the statistical NLU module, and the decider are comprised within a chatbot. The chatbot is configured to provide a processed language output based on the third intent. The rule-based NLU module comprises an intent determiner and at least one of patterns or grammars to determine the first intent. The statistical NLU module comprises an intent determiner and a trained model of input text over intentions to determine the second intent. The rule-based NLU module comprises a first confidence value determiner configured to determine a first intent confidence value, and the statistical NLU module comprises a second confidence value determiner configured to determine a second intent confidence value. The decider is further configured to determine the third intent further based on the first intent confidence value and the second intent confidence value. A training module is configured to train the statistical NLU module. A trainer configured to train the decider.

In an implementation, a method of hybrid natural language understanding (NLU) is provided. The method may include receiving an input data at a rule-based NLU module; receiving the input data at a statistical NLU module; determining a first intent at the rule-based NLU module using the input data; determining a second intent at the statistical NLU module using the input data; determining a third intent at a decider using the first intent and the second intent; and outputting the third intent.

Implementations may include some or all of the following features. Providing a processed language output, by a chatbot, based on the third intent. Determining the first intent comprises using an intent determiner and at least one of patterns or grammars to determine the first intent. Determining the second intent comprises using an intent determiner and a trained model of input text over intentions to determine the second intent. Determining a first intent confidence value and a second intent confidence value. Determining the third intent is further based on the first intent confidence value and the second intent confidence value. Training the statistical NLU module and the decider.

In an implementation, a system is provided. The system includes: a natural language understanding (NLU) component configured to determine a rule-based NLU intent using an input data, determine a statistical NLU intent using the input data, determine an intent using the rule-based NLU intent and the statistical NLU intent, and outputting a processed language output based on the intent; and a memory that stores training data for the NLU component.

Implementations may include some or all of the following features. The input data comprises chat data and wherein the NLU component is comprised within a chatbot. The NLU component is further configured to determine a first intent confidence value for the rule-based NLU intent and a second intent confidence value for the statistical NLU intent, and to determine the intent further based on the first intent confidence value and the second intent confidence value.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
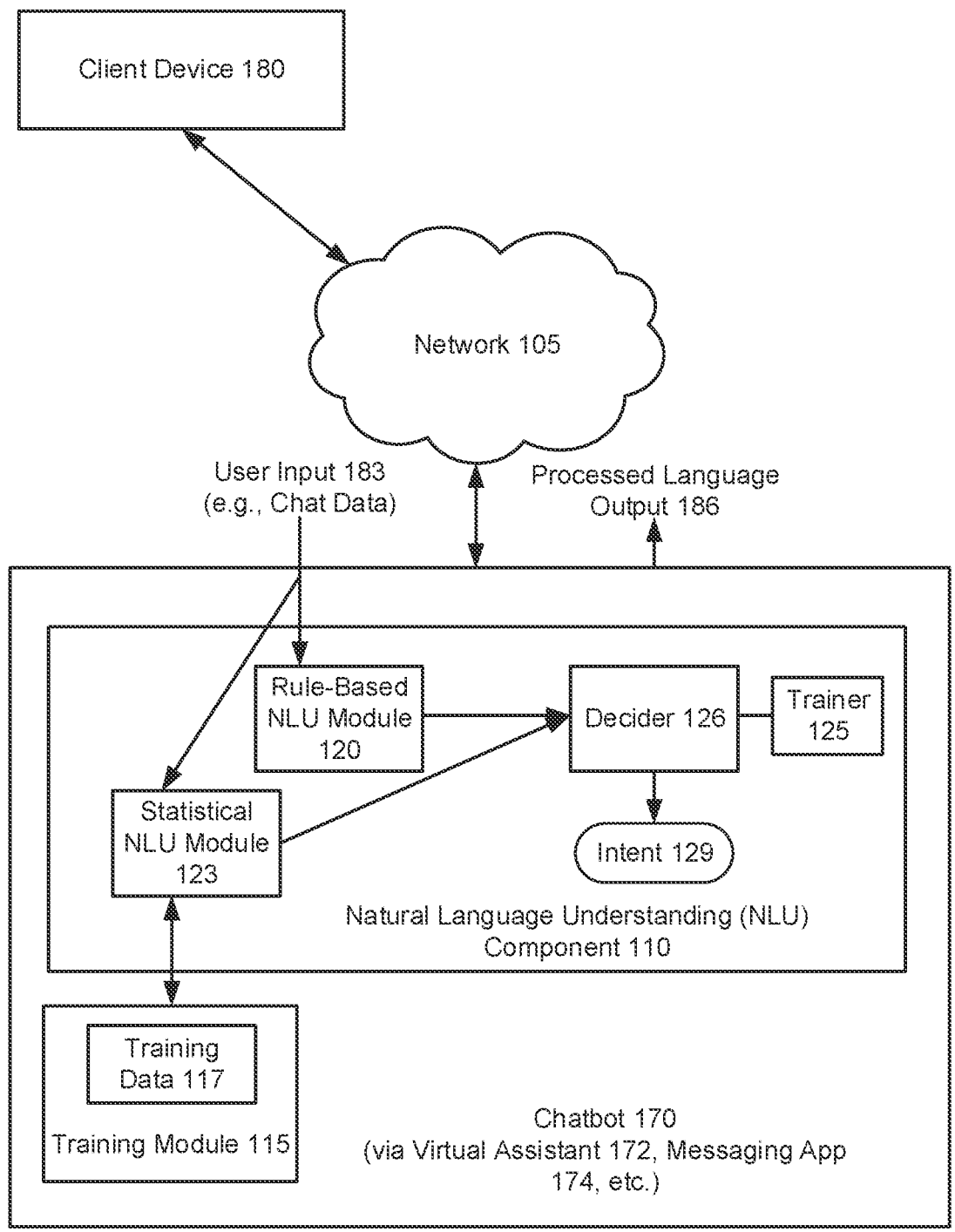
FIG. 1 is an illustration of an exemplary environment for hybrid natural language understanding (NLU)

FIG. 1 is an illustration of an exemplary environment 100 for hybrid natural language understanding (NLU). The environment 100 may include a chatbot 170 and a client device 180 in communication through a network 105. The network 105 may be a variety of network types including the public switched telephone network (PSTN), a cellular telephone network, and a packet switched network (e.g., the Internet). Although only one chatbot 170 and one client device 180 are shown in FIG. 1, there is no limit to the number of chatbots and client devices that may be supported.

Figure 6:
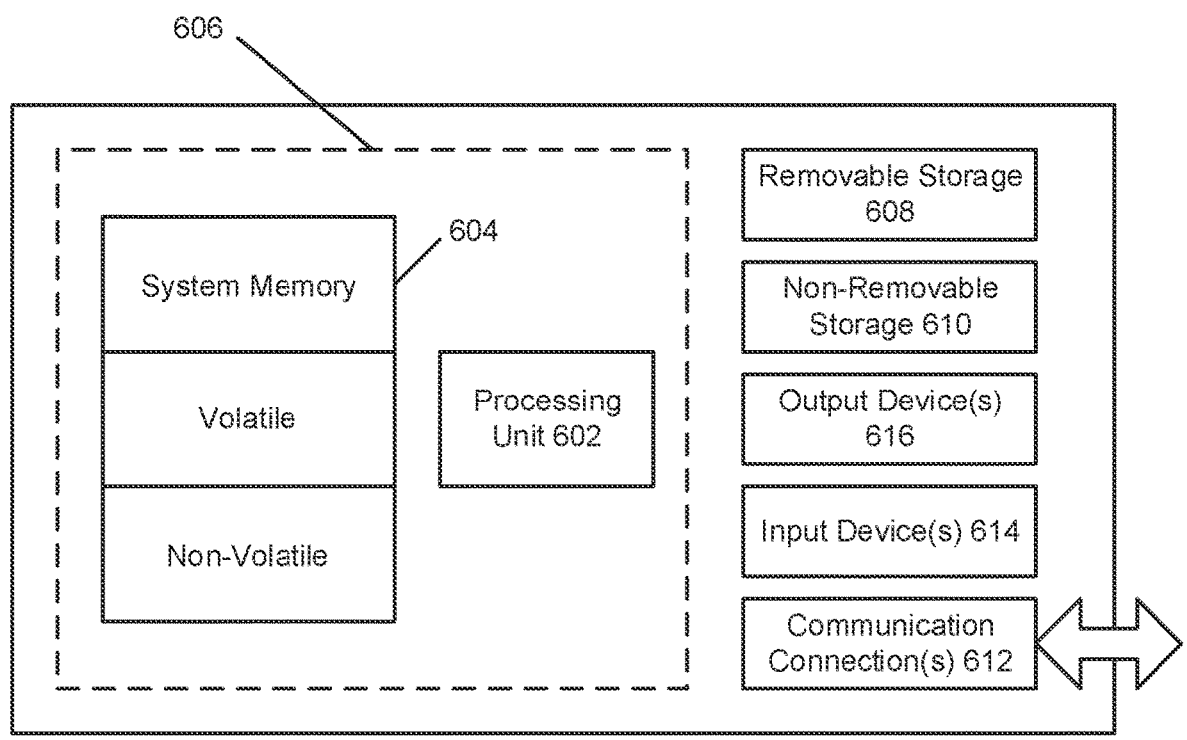
FIG. 6 shows an exemplary computing environment in which example embodiments and aspects may be implemented.

The chatbot 170 and the client device 180 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 6 as the computing device 600.

The chatbot 170 is in communication with the client device 180 and is capable of conducting a conversation with a user through the client device 180. The chatbot 170 may comprise a computer program or artificial intelligence application that conducts a conversation with the client device 180 via textual methods, in an implementation. Alternatively or additionally, the chatbot 170 may conduct a conversation with the client device via auditory methods. Depending on the implementation, the chatbot 170 may be accessed via a virtual assistant 172, a messaging app 174, or by other apps or websites.

The chatbot 170 comprises a natural language understanding (NLU) component 110. The NLU component 110 comprises a rule-based NLU module 120 and a statistical NLU module 123. Any type of a rule-based NLU module and any type of statistical NLU module may be used with the embodiments described or otherwise contemplated herein. The NLU component further comprises a trainer 125 and a decider module referred to herein as a decider 126. As described further herein, the decider 126 outputs an intent 129. Although only one rule-based NLU module 120, one statistical NLU module 123, and one decider 126 are shown in FIG. 1, there is no limit to the number of rule-based NLU modules, statistical NLU modules, and deciders that may be supported.

Figure 2:
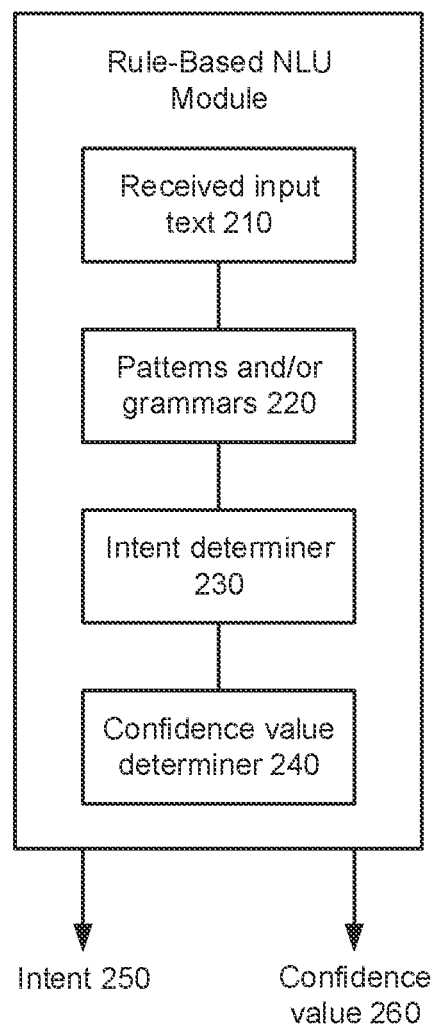
FIG. 2 is a diagram of an example rule-based NLU module.

FIG. 2 is a diagram of an example rule-based NLU module 120. As described further herein, the rule-based NLU module 120 uses received input text 210, patterns and/or grammars 220, an intent determiner 230, and a confidence value determiner 240, and generates an intent 250 that is provided to the decider 126. In some implementations, a confidence value 260 associated with the intent 250 is also provided to the decider 126. It is contemplated that the confidence values herein may be depending on the implementation, for example, a scalar, a floating point value between 0 and 1, a collection of information that collectively serves as indicators of confidence or accuracy (e.g., metrics such as (1) number of terms understood; (2) how much of the input was understood; (3) amount of input; and/or (4) length of input), and/or may include a representation of the intent output (or otherwise predicted) by each NLU module.

Figure 3:
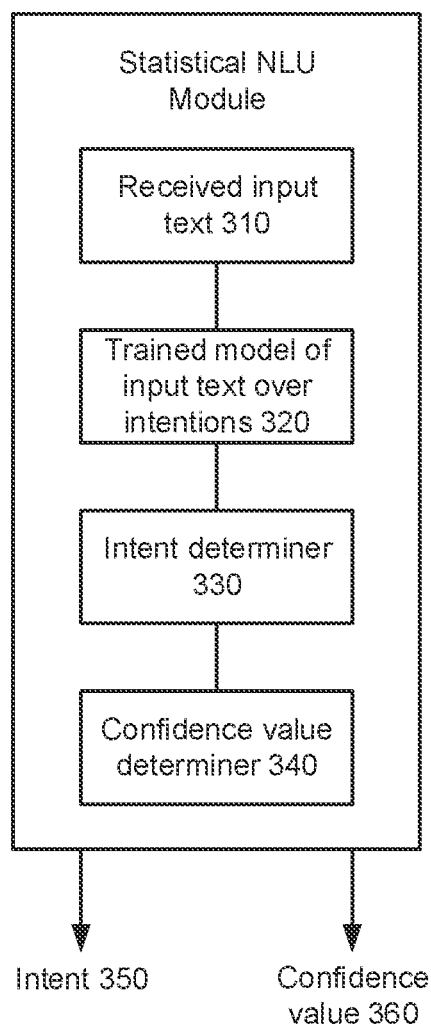
FIG. 3 is a diagram of an example statistical NLU module.

FIG. 3 is a diagram of an example statistical NLU module 123. As described further herein, the statistical NLU module 123 uses received input text 310, a trained model of input text over intentions 320, an intent determiner 330, and a confidence value determiner 340, and generates an intent 350 that is provided to the decider 126. In some implementations, a confidence value 360 associated with the intent 350 is also provided to the decider 126.

Returning to FIG. 1, user input 183, such as chat data, from the client device 180 is provided to the NLU component 110. While chatbots encourage conversational interaction, the user input 183 may also comprise inputs that are keyword searches or non-conversational. Depending on the implementation, the user input 183 may be provided directly from the client device 180 (e.g., via the network 105) or from the chatbot 170 (e.g., via the network 105). The NLU component 110 processes the user input 183 and outputs processed language output 186 using the intent 129. The intent 129 is the user intention which is then used to determine how to respond to that intention. In an implementation, the processed language output 186 may comprise the input's action, object, actor, indirect object, and/or their respective modifying details.

In some implementations, the chatbot 170 comprises a training module 115. The training module 115 may comprise training data 117 and may be used to train the statistical NLU module 123. The training data 117 may be based on human to virtual assistant chat data. In an implementation, user inputs are captured from a commercial virtual agent chatbot and used for generating the training data 117. This data is typically short inputs ranging from two to 22 words with an average of 8.5 words. These inputs range between keyword searches and more conversational questions. The training data 117 may be weighted toward imperatives, statives, and interrogatives. In an implementation, the training data 117 is hand tagged.

The rule-based NLU module 120 and the statistical NLU module 123 each receive and process the user input data 183 (e.g., as the received input text 210, 310, respectively), and provide their outputs (e.g., the intent 250, 350 determined by each of the modules 120 and 123, and in some implementations the confidence value 260, 360) to the decider 126. The decider 126 considers the intents 250, 350 (and in some implementations, the confidence values 260, 360) returned by each module 120, 123 and determines which of the intents to return (i.e., to output as the intent 129). Thus, the decider 126 determines which module 120, 123 is providing the most correct intent to the decider 126.

The decider 126 may determine the intent to return (as the intent 129) using prior knowledge of individual modules 120, 123 performance on the intent 250, 350 the individual module 120, 123 provided to the decider 126, and/or based on the confidence values 260, 360 or other scoring metrics returned by the modules 120, 123 along with the intent. The trainer 125 may receive and compile such prior knowledge and performance information and train the decider 126 accordingly.

In an implementation, the decider 126 selects the intent to return (from the intents 250, 350 provided by the modules 120, 123) by evaluating the amount of the input text that was consumed by the rule-based NLU module 120 along with additional features such as confidence value. In other words, in an implementation, the decider 126 determines which intent to return based on how much the rule-based NLU module 120 is being used. In an implementation, the rule-based NLU module 120 has the ability to override the decider 126 in the cases where the matched intent is required to match, for instance based on business rules or federal regulations.

Leveraging the speed and lower complexity of annotating the training data 117 (using the trained model of input text over intentions 320) for the statistical NLU module 123 over human curated rule generation, the statistical NLU module 123 may be constructed first. As the rule-based NLU module 120 has no patterns yet defined, it will not consume any of the input text initially. Therefore, the decider 126 will return the intent 350 selected and provided to the decider 126 by the statistical NLU module 123. As intents are added to the language models in the modules 120, 123 that require conversational context to properly identify, patterns and/or grammars 220 can be constructed for them in the rule-based NLU module 120. Once patterns and/or grammars 220 exist for a given intent in the rule-based NLU module 120, the decider 126 can determine how much of the text input was consumed by the patterns to decide between the intent provided by the rule-based NLU module 120 and the intent provided by the statistical NLU module 123, when they differ.

For example, suppose that the following pattern existed in the rule-based NLU module 120 associated with the intention of transferring to a live agent:

(t(alk|ransfer)|phone|c(all|ontact)|speak|need).+(customer (\s+)?(s(ervice|upport))|(a\s+)?rep(resentative)?|someone\s?else|(a|the|your)\s+manager|a\s+((live|real)\s+)?(human(\s?being)?|person)|reservations|number)

If the user input text is something like "I want to talk to your manager", the text "talk to your manager" would be consumed by the pattern, and would be a strong indication that the rule-based NLU module 120 understood the intent correctly. If the input text was instead "I just got off the phone with reservations and they told me the form I needed to register my dog as a service animal was on your website, but I can't find it", only "phone with reservations" would match, representing a small percentage of the total input and indicating the rule-based NLU module 120 intent 250 may not be correct. If, at the same time, the confidence value (if any) of the statistical NLU module 123 intent is acceptable and any other features the decider 126 consults indicated the statistical NLU module 123 is correct, the decider would instead return the intent 350 provided by the statistical NLU module 123.

In an implementation, at runtime, both the rule-based NLU module 120 and the statistical NLU module 123 determine a respective intent based on the user input 183, using the intent determiner 230, 330 respectively.

In an implementation, a confidence value of the rule-based NLU module 120 may be determined by the confidence value determiner 240. The confidence value may be based on (1) number of terms understood; (2) how much of the input was understood; (3) amount of input; and/or (4) length of input.

In an implementation, a confidence value of the statistical NLU module 123 may be determined using the confidence value determiner 340 (e.g., using any known statistical probability distribution).

In an implementation, the confidence value 360 from the statistical NLU module 123 is provided to the decider 126, along with the confidence value 260 from the rule-based NLU module 120. The decider 126 outputs one of (1) both modules' intent is correct, (2) only the rule-based NLU module 120's intent is correct, (3) only the statistical NLU module 123's intent is correct, (4) neither module's intent is correct. The decider 126 may use its previous training (e.g., from the trainer 125) to reach its decision of (1), (2), (3), or (4). The winning selection of (1), (2), (3), or (4) may then be determined to be the intent 129.

By only creating rules for intents that require context or business logic to match, human effort is optimized without sacrificing the performance of the NLU component 110. Human-curated rules are only used where necessary, and the hybrid approach allows the NLU component 110 to evolve as needed to support business rules and regulations without losing the lower cost of development and training time of statistical approaches.

This approach differs from that of other combinatory approaches, in the fact that it does not require prior performance history from the models or modules 120, 123 in order to train the decider 126. It also is explicitly designed to leverage the strengths of different language modeling approaches. In addition, the NLU construction process is optimized for cost and time reduction, not accuracy alone.

This hybrid approach of starting with a statistical model (the statistical NLU module 123) and augmenting it with a rules-based model (the rule-based NLU module 120) can be applied to other aspects of IVAs as well. Common Natural Language Processing (NLP) tasks that can use either rules-based or statistical methods would benefit from this hybrid approach. For example, tasks such as part of speech tagging and named entity recognition are commonly performed during pre-processing of text for more complicated NLP tasks. Such tasks could benefit from this hybrid construction approach as corpora exist for training statistical models, but modifications are commonly needed for domain specific IVAs.

Figure 4:
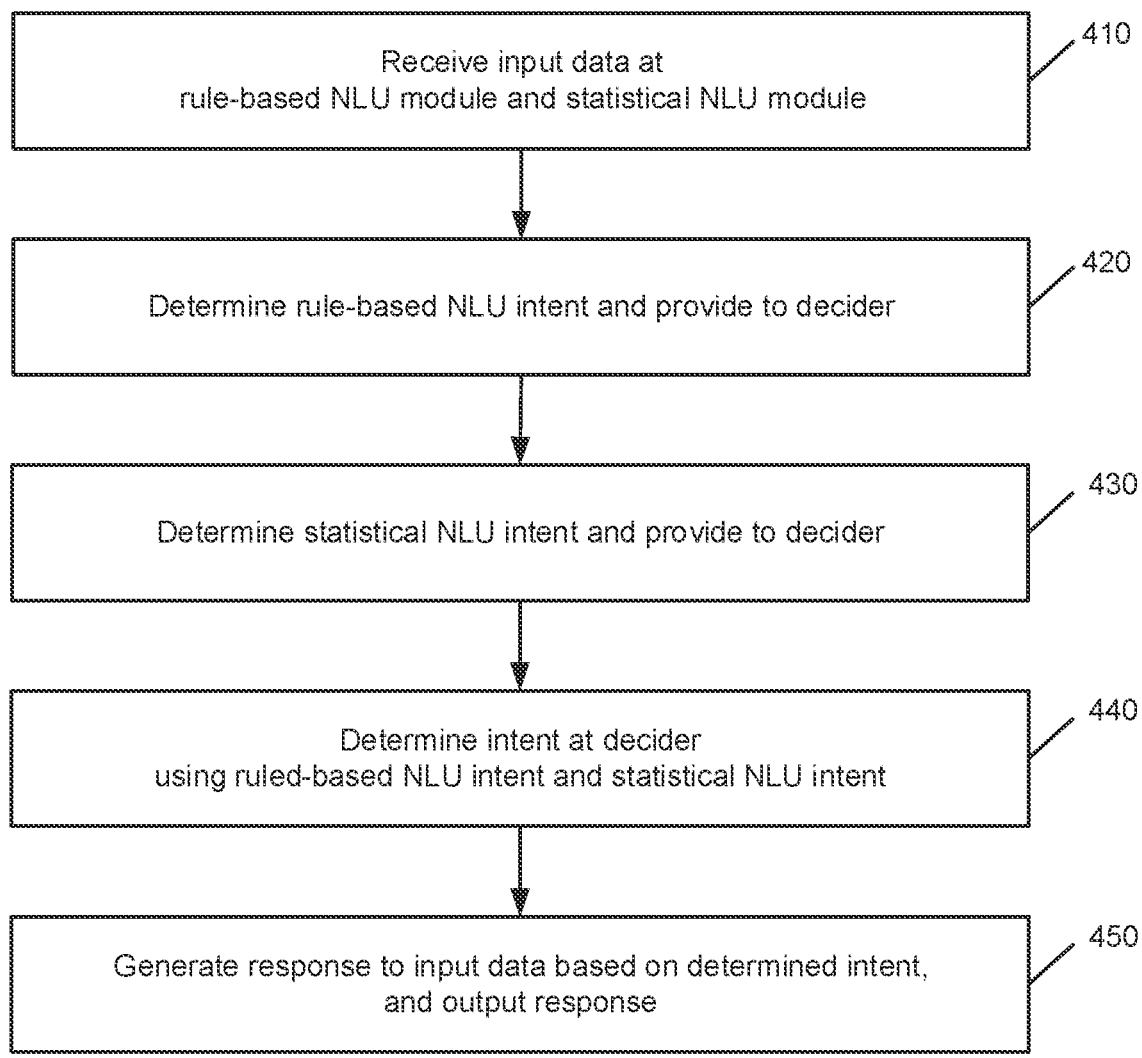
FIG. 4 is an operational flow of an implementation of a method for hybrid natural language understanding.

FIG. 4 is an operational flow of an implementation of a method 400 for hybrid natural language understanding. The method 400 may be implemented using the chatbot 170 in conjunction with the environment 100, in some implementations.

At 410, input data, such as the user input 183, is received at the rule-based NLU module 120 and the statistical NLU module 123 (e.g., as the received input text 210 and 310, respectively).

At 420, the rule-based NLU module 120 processes the received input text 210 and determines an intent 250, e.g., using the intent determiner 230 and using the patterns and/or grammars 220. The intent 250 is provided to the decider 126.

At 430, the statistical NLU module 123 processes the received input text 310 and determines an intent 350, e.g., using the intent determiner 330 and using the trained model of input text over intentions 320. The intent 350 is provided to the decider 126.

At 440, the decider 126 determines which intent 250, 350 is to be selected and returned as the intent 129, using techniques described above with respect to FIG. 1. In some implementations, the decider 126 may determine that both of the intents 250, 350 are correct, or that neither of the intents 250, 350 is correct.

At 450, the chatbot 170 may generate a response to the input data based on the determined intent 129 and output the response as processed language output 186.

Figure 5:
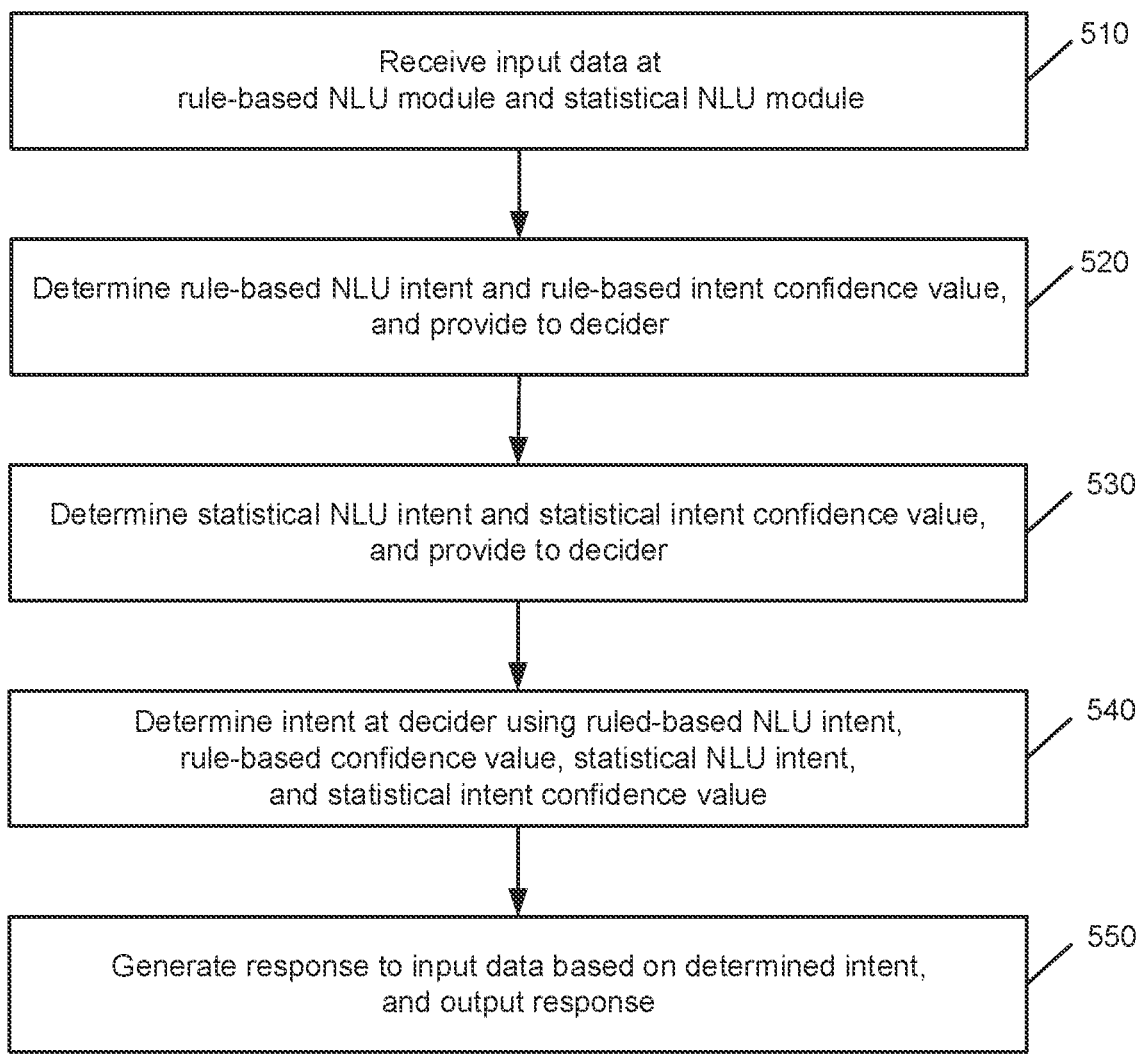
FIG. 5 is an operational flow of an implementation of a method for hybrid natural language understanding.

FIG. 5 is an operational flow of an implementation of a method 500 for hybrid natural language understanding. The method 500 may be implemented using the chatbot 170 in conjunction with the environment 100, in some implementations.

At 510, input data, such as the user input 183, is received at the rule-based NLU module 120 and the statistical NLU module 123 (e.g., as the received input text 210 and 310, respectively).

At 520, the rule-based NLU module 120 processes the received input text 210 and determines an intent 250, e.g., using the intent determiner 230 and using the patterns and/or grammars 220. The rule-based NLU module 120 also determines a confidence value 260, e.g., using the confidence value determiner 240. The intent 250 and the confidence value 260 are provided to the decider 126.

At 530, the statistical NLU module 123 processes the received input text 310 and determines an intent 350, e.g., using the intent determiner 330 and using the trained model of input text over intentions 320. The statistical NLU module 123 also determines a confidence value 360, e.g., using the confidence value determiner 340. The intent 350 and the confidence value 360 are provided to the decider 126.

At 540, the decider 126 determines which intent 250, 350 is to be selected and returned as the intent 129, using techniques described above with respect to FIG. 1 in conjunction with the confidence values 260, 360. In some implementations, the decider 126 may determine that both of the intents 250, 350 are correct, or that neither of the intents 250, 350 is correct.

At 550, the chatbot 170 may generate a response to the input data based on the determined intent 129 and output the response as processed language output 186.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 6 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for hybrid natural language understanding (NLU) is provided. The system includes a rule-based NLU module configured to determine a first intent based on a user input; a statistical NLU module configured to determine a second intent based on the user input; and a decider configured to determine and output a third intent based on the first intent and the second intent.

Implementations may include some or all of the following features. The rule-based NLU module, the statistical NLU module, and the decider are comprised within a computing device. The rule-based NLU module, the statistical NLU module, and the decider are comprised within a chatbot. The chatbot is configured to provide a processed language output based on the third intent. The rule-based NLU module comprises an intent determiner and at least one of patterns or grammars to determine the first intent. The statistical NLU module comprises an intent determiner and a trained model of input text over intentions to determine the second intent. The rule-based NLU module comprises a first confidence value determiner configured to determine a first intent confidence value, and the statistical NLU module comprises a second confidence value determiner configured to determine a second intent confidence value. The decider is further configured to determine the third intent further based on the first intent confidence value and the second intent confidence value. A training module is configured to train the statistical NLU module. A trainer configured to train the decider.

In an implementation, a method of hybrid natural language understanding (NLU) is provided. The method may include receiving an input data at a rule-based NLU module; receiving the input data at a statistical NLU module; determining a first intent at the rule-based NLU module using the input data; determining a second intent at the statistical NLU module using the input data; determining a third intent at a decider using the first intent and the second intent; and outputting the third intent.

Implementations may include some or all of the following features. Providing a processed language output, by a chatbot, based on the third intent. Determining the first intent comprises using an intent determiner and at least one of patterns or grammars to determine the first intent. Determining the second intent comprises using an intent determiner and a trained model of input text over intentions to determine the second intent. Determining a first intent confidence value and a second intent confidence value. Determining the third intent is further based on the first intent confidence value and the second intent confidence value. Training the statistical NLU module and the decider.

In an implementation, a system is provided. The system includes: a natural language understanding (NLU) component configured to determine a rule-based NLU intent using an input data, determine a statistical NLU intent using the input data, determine an intent using the rule-based NLU intent and the statistical NLU intent, and outputting a processed language output based on the intent; and a memory that stores training data for the NLU component.

Implementations may include some or all of the following features. The input data comprises chat data and wherein the NLU component is comprised within a chatbot. The NLU component is further configured to determine a first intent confidence value for the rule-based NLU intent and a second intent confidence value for the statistical NLU intent, and to determine the intent further based on the first intent confidence value and the second intent confidence value.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A hybrid natural language understanding (NLU) system, comprising:
a chatbot coupled to a processor, the chatbot comprising:
a rule-based NLU module configured to determine a first intent using an input during a conversation between a client device and the chatbot;
a statistical NLU module configured to determine a second intent using the input; and
a decider configured to determine a third intent using the first intent and the second intent, wherein the third intent is further determined by the decider:
(1) determining whether both the first intent and the second intent are correct,
(2) determining whether only the first intent is correct,
(3) determining whether only the second intent is correct, and
(4) determining whether neither the first intent nor the second intent is correct, wherein the chatbot is configured to generate and provide a processed language output using the third intent.

2. The system of claim 1, wherein the rule-based NLU module, the statistical NLU module, and the decider are comprised within a computing device.

3. The system of claim 1, wherein the input is from the client device.

4. The system of claim 1, wherein the rule-based NLU module comprises an intent determiner and at least one of patterns or grammars to determine the first intent.

5. The system of claim 1, wherein the statistical NLU module comprises an intent determiner and a trained model of input text over intentions to determine the second intent.

6. The system of claim 1, further comprising a training module configured to train the statistical NLU module.

7. The system of claim 1, further comprising a trainer configured to train the decider.

8. A method of hybrid natural language understanding (NLU), the method comprising:
receiving an input data at a rule-based NLU module comprised within a chatbot, wherein the input data is received during a conversation between a client device and the chatbot;
receiving the input data at a statistical NLU module comprised within the chatbot;
determining a first intent at the rule-based NLU module using the input data;
determining a second intent at the statistical NLU module using the input data;
determining a third intent at a decider using the first intent and the second intent, and:
(1) determining whether both the first intent and the second intent are correct,
(2) determining whether only the first intent is correct,
(3) determining whether only the second intent is correct, and
(4) determining whether neither the first intent nor the second intent is correct; and
generating and providing a processed language output from the chatbot using the third intent.

9. The method of claim 8, wherein determining the first intent comprises using an intent determiner and at least one of patterns or grammars to determine the first intent.

10. The method of claim 8, wherein determining the second intent comprises using an intent determiner and a trained model of input text over intentions to determine the second intent.

11. The method of claim 8, further comprising training the statistical NLU module and the decider.

12. A chatbot system comprising:
a processor; and
a natural language understanding (NLU) component configured to determine a rule-based NLU intent using an input data from a conversation between a client device and a chatbot, determine a statistical NLU intent using the input data, determine an intent using the rule-based NLU intent and the statistical NLU intent, and by: (1) determining whether both the rule-based NLU intent and the statistical NLU intent are correct, (2) determining whether only the rule-based NLU intent is correct, (3) determining whether only the statistical NLU intent is correct, and (4) determining whether neither the rule-based NLU intent nor the statistical NLU intent is correct, and generate and output a processed language output using the intent.

13. The system of claim 12, further comprising a memory that stores training data for the NLU component.

14. The system of claim 12, wherein the input data comprises chat data.

15. The system of claim 12, wherein the input data is from the client device.

16. The system of claim 12, wherein the NLU component comprises a rule-based NLU module configured to determine the rule-based NLU intent using the input data during the conversation between the client device and the chatbot.

17. The system of claim 16, wherein the NLU component comprises a statistical NLU module configured to determine the statistical NLU intent using the input data.

18. The system of claim 17, wherein the rule-based NLU module comprises at least one of patterns or grammars to determine the rule-based NLU intent, and wherein the statistical NLU module comprises a trained model of input text over intentions to determine the statistical NLU intent.

19. The system of claim 12, wherein the NLU component comprises a decider configured to determine the intent using the rule-based NLU intent and the statistical NLU intent and by: (1) determining whether both the rule-based NLU intent and the statistical NLU intent are correct, (2) determining whether only the rule-based NLU intent is correct, (3) determining whether only the statistical NLU intent is correct, and (4) determining whether neither the rule-based NLU intent nor the statistical NLU intent is correct.

20. The system of claim 19, further comprising a trainer configured to train the decider.

* * * * *